United States Patent

Heuer

Patent Number: 5,914,284
Date of Patent: Jun. 22, 1999

[54] SYSTEM FOR GENERATING METHANE GAS FROM SEWER SLUDGE AND PROCESS UTILIZING SAME

[76] Inventor: Kenneth Heuer, 3 Pewter Pl., Dix Hills, N.Y. 11746

[21] Appl. No.: 08/905,597

[22] Filed: Aug. 4, 1997

[51] Int. Cl.$^6$ .............................. C10J 1/28; C01B 3/32; C10L 3/00
[52] U.S. Cl. ...................... 48/197 A; 48/127.3; 48/127.5; 48/127.7
[58] Field of Search .............................. 48/197 A, 127.3, 48/127.5, 127.7; 210/603, 652, 748, 753

[56] References Cited

U.S. PATENT DOCUMENTS

| | | | |
|---|---|---|---|
| 2,282,225 | 9/1942 | Hawley et al. | 210/2 |
| 4,057,401 | 11/1977 | Boblitz | 48/111 |
| 4,323,367 | 4/1982 | Ghosh | 48/198 A |
| 4,396,402 | 8/1983 | Ghosh | 48/197 A |
| 4,624,417 | 11/1986 | Gangi | 241/17 |
| 4,642,187 | 2/1987 | Schimel | 210/258 |
| 4,818,255 | 4/1989 | Matsuura et al. | 55/16 |
| 5,006,249 | 4/1991 | Green et al. | 210/603 |
| 5,032,289 | 7/1991 | Martineau | 210/247 |

FOREIGN PATENT DOCUMENTS

| | | |
|---|---|---|
| 5 5088-896 | 12/1978 | Japan . |
| 6 2050-000-A | 8/1985 | Japan . |

OTHER PUBLICATIONS

Handbook of Chemistry and Physics; David Lide, 1995.

*Primary Examiner*—Glenn Caldarola
*Assistant Examiner*—Thuan D. Dang
*Attorney, Agent, or Firm*—Martin S. Glass, Esq.

[57] ABSTRACT

A system is provided for processing a volume of human sludge with sea water and chemical reactants to generate methane gas and to reduce the volume by at least eighty percent (80%). This is by having a series of processing containers for receiving, holding and processing the sludge volume by way of a volume of sea water and chemical reactants. A first processing container is constructed with a means for mechanically agitating the sludge volume and collecting methane gas released therefrom. The system further has a second processing container for processing a sludge mixture transferred from the first processing container for further treatment of said sludge mixture by sea water and chemical reactants with a means for collecting methane gas released therefrom. A filter system for filtering said sludge volume and said sludge mixture is included in each of the processing containers.

6 Claims, 2 Drawing Sheets

SYSTEM FOR GENERATING METHANE GAS FROM SEWER SLUDGE AND PROCESS UTILIZING SAME

BACKGROUND OF THE INVENTION

1. Field of the Invention

This invention relates generally to the processing of sewer sludge and, more particularly, relates to a system for processing human sludge with sea water and one or more chemical reactants to realize methane, clean water and solid refuse, and process for implementing same.

2. Description of the Related Art

Various systems and processes are known for converting solid waste and/or sewer sludge into methane, harmless effluent and a small amount of solid waste. For example, U.S. Pat. No. 4,624,417 discloses a process for converting solid waste and sewage sludge into energy sources and a separate recyclable by-product from the energy generation procedure. The process converts the waste into a chemical intermediate substrate from which energy sources, such as solid carbon fuel product, methane gas, or separate steam and non-energy related by-products can be produced.

Processing human sewage has become an acute problem for municipal services, especially in urban areas with populations exceeding a million people. One reason is that conventional methods of processing raw sewage require enormous amounts of land which is just not always available. In efforts to overcome problems associated with sludge processing, various methods have been developed. For example, U.S. Pat. No. 5,032,289 discloses an "off-shore" processing system facility for treatment of urban sewage without the need to use or contaminate urban land. However, transportation of the sludge to and from the facility can become quite costly.

U.S. Pat. No. 4,057,401 discloses apparatus for manufacture of methane gas from sewage sludge and other organic waste. The apparatus includes a digester tank system, a solar heating unit and conduit means to use hot air from the solar heater to heat the digester tank/tanks. The methane is generated by bacteria which digests waste mixed with fresh water to form a slurry at a Ph in a range from about six (6) to eight (8), and the Ph-adjusted slurry is then heated and agitated for about ten (10) days at temperatures in a range of from about 100 degrees to 140 degrees Fahrenheit. As with the processing recited in U.S. Pat. No. 5,032,289, this specialized processing disclosed in the '401 patent can become quite costly.

A need therefore exists for a device and/or system that is constructed in such a manner to facilitate processing human sludge in an expedient manner without the need for external heating or enormous amounts of land. A further need exists for such a processing system, the final end products of which are either usable products, such as methane and water, or minimized waste products, without the need to employ bacteria to digest and/or further minimize said waste products.

SUMMARY OF THE INVENTION

In accordance with the principles of the invention, a system is disclosed which generates methane gas and usable water from sewer sludge and a process utilizing the same. This includes a system for processing a volume of human sludge with a volume of sea water and chemical reactants to generate methane gas and to reduce said sludge volume by at least eighty percent (80%), where there is a processing container for receiving and holding the sludge volume. This processing container also contains a volume of sea water and chemical reactants and is constructed for mechanically agitating the sludge volume to form a processed sludge mixture and collecting methane gas released therefrom. A second processing container further processes the processed sludge mixture transferred from the first processing container with an additional volume of sea water and chemical reactants, and a means for collecting methane gas released therefrom. A filter system for filtering the sludge mixture is also present in the second processing container.

DESCRIPTION OF THE DRAWINGS

Preferred embodiments of the apparatus and method of this invention are described in detail herein with reference to the following drawings, wherein.

DETAILED DESCRIPTION OF PREFERRED EMBODIMENTS

Figure 1:
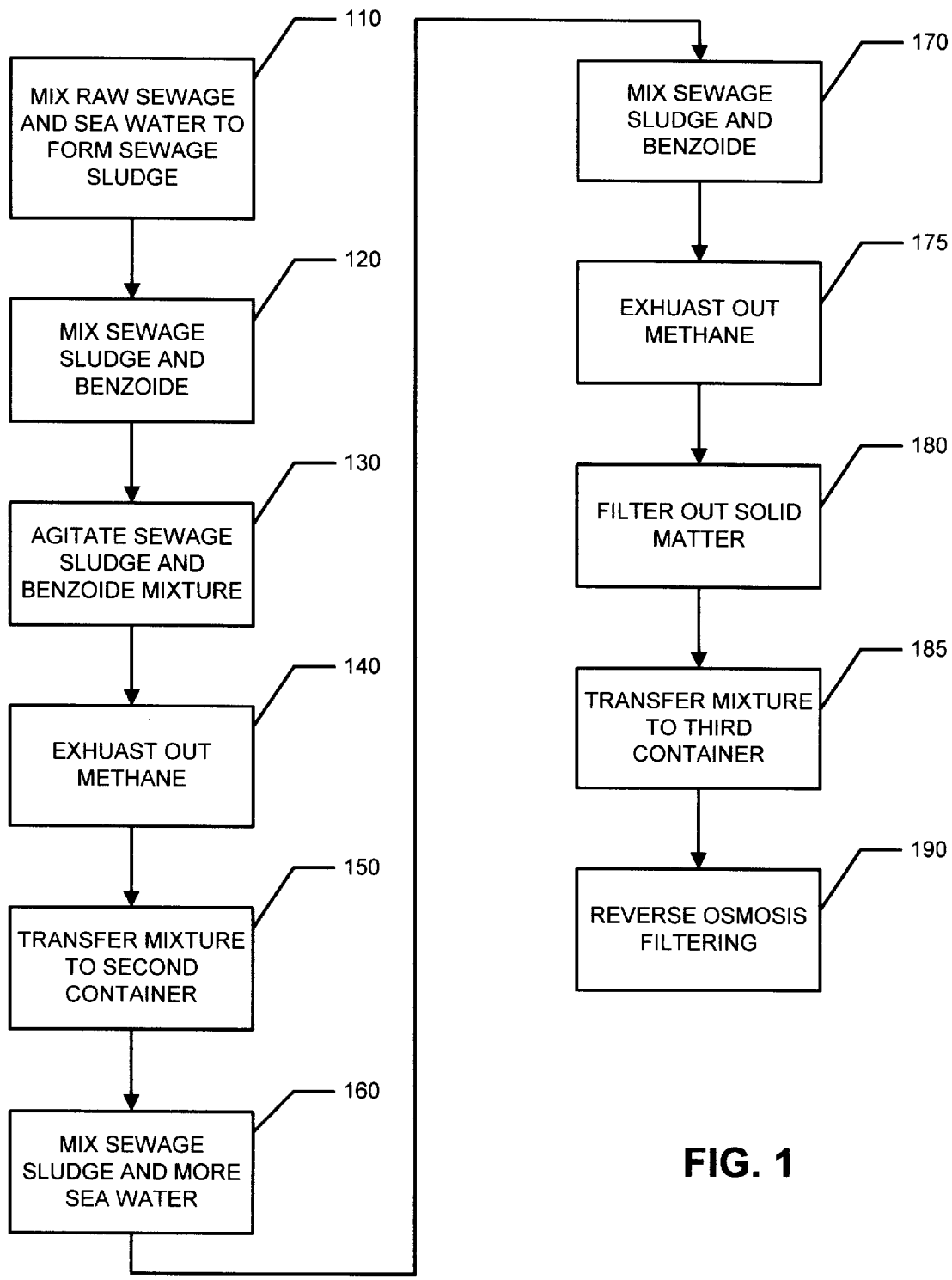
FIG. 1 is a flow chart representation of a process of the present invention for generating methane gas from human sludge.
Figure 2:
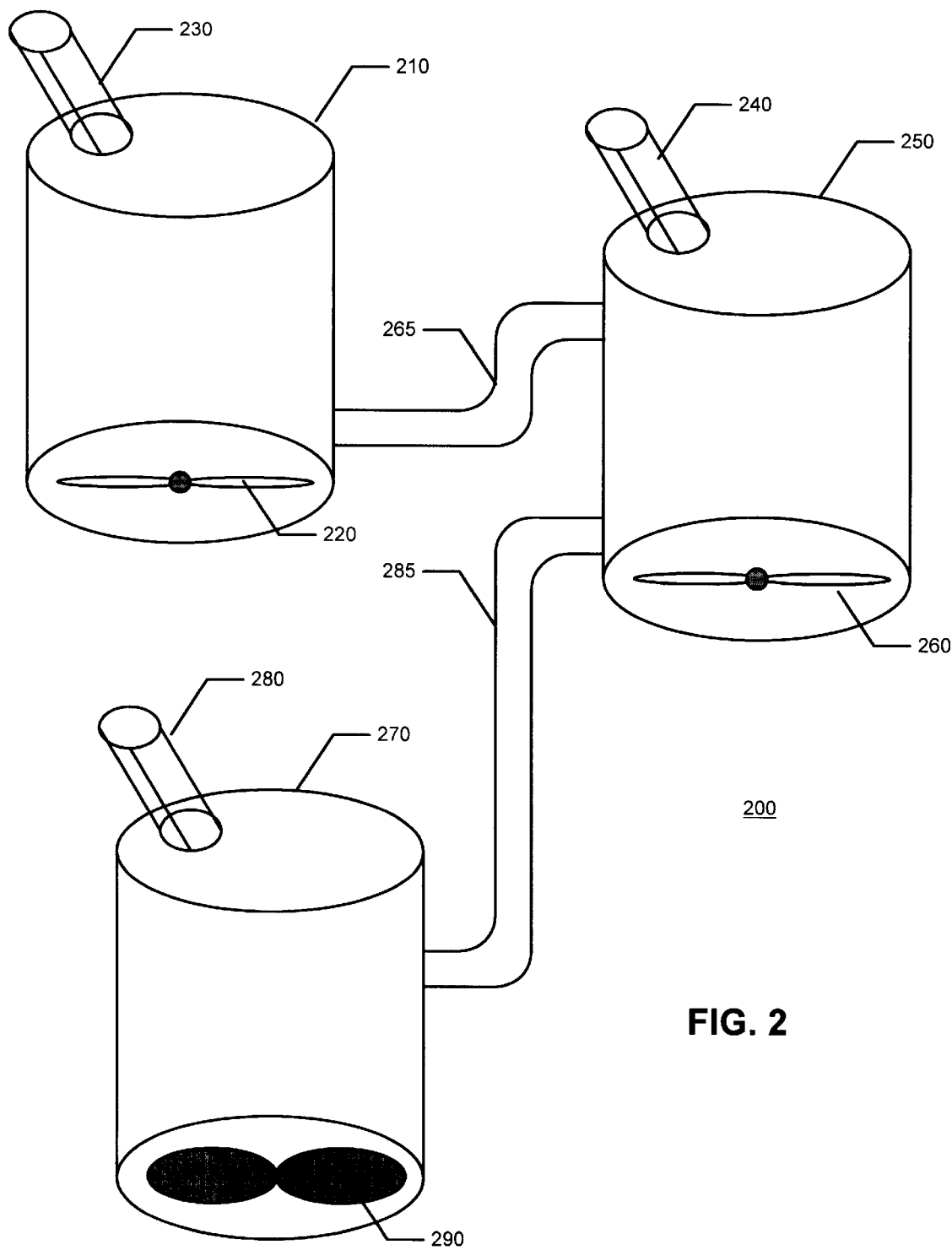
FIG. 2 is a drawing of a typical sludge container and agitator of the present invention.

A first embodiment of the system 200 of this invention will now be described with reference to FIG. 2 and the processing flow chart of FIG. 1. More specifically, the system 200 of this invention will be described as shown in FIG. 2, and the process for using same will be described with reference to the flow processing blocks of FIG. 1. For that matter, block 110 of FIG. 1 represents the first step in processing raw human sludge in accordance with this invention.

To carry out the first step for processing sludge to realize methane, a first processing container, such as sludge container 210 shown in FIG. 2, is required. Sludge container 210 is constructed with means 220 for mechanically agitating materials contained within the container's volume. Sea water and raw sewage are combined within sludge container 210 in approximately equal amounts by weight. Preferably, amounts of sewage sludge and sea water mixture are transferred to the sludge container in amounts which does not exceed three-quarters (¾) of the volume of the first container (i.e. sludge container 220), as shown in block 110.

About another ten percent (10%) of benzoid, by weight of the total volume of the mixture within the first sludge container 210, is added to the sea water/sludge mixture. Benzoid is a preferred organic processing catalyst of this invention, comprising iodine and benzoin and is added into the first sludge container as shown in block 120. Preferable, the iodine is derived from seaweed. Conventional benzoin is known for its use in antiseptic ointments. The benzoid is stirred or agitated into the first container 210, as shown in block 130, to react with the sludge and begin the chemical or reactant portion of the process of the invention via agitation means 220.

By chemically processing the mixture with benzoid, while applying mechanical agitation by agitation means 220, methane gas is released from the sludge/sea water mixture. Gas collection means 230 are provided by the system 200 for recovering the methane gas. Block 140 shows the conventional recovery of the methane gas.

When the average hourly rate of methane gas generated (and qualified by means 230) is found to be two orders of magnitude less than the average rate of generation just after the benzoid addition, the remaining treatment mixture of the first container is transferred to a second sludge container 250, which also employs a means for mechanical agitation 260. The transfer of the mixture from the first container to the second container is represented by block 150 through the use of transfer means 265. The partially processed sludge/sea water/benzoid mixture is again diluted with sea water in approximately a 2-to-1 ratio of sea water mix to the mixture by weight, as represented in block 160. A second amount of benzoid is added to the diluted mixture within the sludge container 250 while mechanically agitating same by means 260, as shown in FIG. 2 and as represented in 170 in FIG. 1. The amount of benzoid added is only about 0.5 to 3.0 percent of the weight of the whole mixture contained in the second sludge container 250. Methane gas is again collected from the second container by gas collection means 240, as shown in FIG. 2, and represented in block 175 of FIG. 1.

The processing mixture present in sludge container 250 must be filtered to remove some of the solid particulate matter not broken down by the benzoid and sea water combination. This filtering is represented in block 180. A portion of the mixture present and being processed in the second container 250 is transferred to a third sludge container 270 via transfer means 285. The mixture is filtered through filter 290, as represented in block 185. Fresh sea water may be added to container 270 during filtering, as well as up to an additional 0.05% by weight of benzoid. Under certain circumstances, reverse osmosis filtering in block 190 may be implemented to separate the solid and liquid phases. Reverse osmosis filters also aide in the desalination of the liquid, producing fresh water and a small amount of solid waste. Another embodiment of filtering is accomplished using sodium bentonite, such as organophilic clay, to withdraw organic matter from the sludge.

In a further embodiment to the present invention, the processing mixture of container 270 is further transferred to a fourth container for final processing by ultraviolet light, as represented in block 195. Ultraviolet light processing is implemented to kill any living matter present in the processing mixture before the liquid part is released for use as purified water. Under certain circumstances, this processing step of block 195 may also be carried out while still in the third container 270.

Although the subject invention has been described with respect to preferred embodiments, it will be readily apparent to those having ordinary skill in the art to which it appertains that changes and modifications may be made thereto without departing from the spirit or scope of the subject invention as defined by the appended claims.

What is claimed is:

1. A method for processing a volume of human sludge with sea water and a benzoid comprising benzoin and iodine to generate methane gas and to reduce said sludge volume by at least eighty percent (80%), comprising the steps of:

mixing said volume of sludge with said volume of sea water and said chemical reactants, by mechanical agitation to produce a processing sludge mixture;

collecting methane gas released from said processing sludge mixture while mechanically agitating same; and filtering said processing sludge mixture.

2. The method of claim 1, wherein said iodine is derived from a plurality of seaweed particles.

3. The method of claim 1, wherein said step of filtering includes reverse osmosis.

4. The method of claim 1, wherein said step of filtering includes separating a solid phase from a liquid phase from said processing sludge mixture.

5. The method of claim 4, further comprising the step of purifying said liquid phase.

6. The method of claim 5, wherein said step of purifying includes subjecting said liquid phase to ultraviolet light in order to kill living matter in said liquid phase.

* * * * *